United States Patent
Bridges et al.

(10) Patent No.: US 7,890,772 B2
(45) Date of Patent: Feb. 15, 2011

(54) MULTI-FUNCTION PRINTING DEVICE

(75) Inventors: Amanda Kay Bridges, Winchester, KY (US); William James Gardner Flowers, Lexington, KY (US); Charles Edward Grieshaber, Versailles, KY (US); Chad Eugene McQuillen, Lexington, KY (US); Michael Ray Timperman, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 1498 days.

(21) Appl. No.: 11/200,691

(22) Filed: Aug. 10, 2005

(65) Prior Publication Data

US 2007/0038872 A1  Feb. 15, 2007

(51) Int. Cl.
G06F 11/30 (2006.01)
G06F 7/04 (2006.01)
G06F 21/00 (2006.01)

(52) U.S. Cl. .................. 713/193; 713/183; 726/28; 705/52; 705/57

(58) Field of Classification Search .............. 726/2–4, 726/26–28; 713/182–186, 189, 193; 380/55, 380/243; 709/223, 225, 229; 700/1, 17, 700/83
See application file for complete search history.

(56) References Cited

U.S. PATENT DOCUMENTS

| | | | | |
|---|---|---|---|---|
| 5,633,932 A * | 5/1997 | Davis et al. | ............... | 713/176 |
| 6,160,629 A * | 12/2000 | Tang et al. | ............... | 358/1.1 |
| 7,072,067 B2 * | 7/2006 | Leiman et al. | ............ | 358/1.15 |
| 7,221,885 B2 * | 5/2007 | Sato | ..................... | 399/81 |
| 7,430,605 B2 * | 9/2008 | Quach et al. | ............... | 709/229 |
| 7,443,527 B1 * | 10/2008 | Shigeeda | .............. | 358/1.15 |
| 7,480,069 B2 * | 1/2009 | Yoshida et al. | ........... | 358/1.16 |
| 2005/0028073 A1 * | 2/2005 | Henry et al. | ............... | 715/500 |
| 2005/0046875 A1 * | 3/2005 | Gibson | ................... | 358/1.1 |
| 2005/0060564 A1 * | 3/2005 | Murakami et al. | ....... | 713/200 |
| 2006/0053481 A1 * | 3/2006 | Olsen et al. | ................. | 726/3 |
| 2006/0082816 A1 * | 4/2006 | Daniel et al. | ............. | 358/1.15 |

* cited by examiner

*Primary Examiner*—Jung Kim
*Assistant Examiner*—Abdulhakim Nobahar (57) ABSTRACT

A document processing device configured to communicate with a first device and a user input device. The document processing device includes a controller having memory. The controller is operable to receive a first communication from the first device. The first communication includes a job to be processed by the printing device and a first shortcut access code associated with the job. The first shortcut access code is stored in the memory of the controller. The controller is also operable to receive a second communication from the user input device. The second communication includes a second shortcut access code. The controller holds the job to be processed until the controller receives the second communication and verifies the second shortcut access code matches the first shortcut access code.

21 Claims, 10 Drawing Sheets

MULTI-FUNCTION PRINTING DEVICE

BACKGROUND

The present invention relates to printing devices and, more particularly, to multi-function or all-in-one devices that provide a variety of document processing functions for large workgroups.

Multi-function devices perform various document processing functions, including printing, scanning, faxing, and e-mailing documents and the like. These devices can be configured to support a large number of users in various working environments.

In multi-user work environments, users are sometimes required to print documents that contain confidential subject matter to a printing device that is available to other users. In some scenarios, when a user submits a confidential print job to a common print device, the document is not printed (or is not otherwise processed in the case of a multi-function device) until the user physically interacts with the device to release the confidential job, typically by entering an identification number that is unique to the user who submitted the job.

SUMMARY

In those working environments that include a large number of users and require the users to use the confidential printing function, the users are often required to access the confidential print jobs through their user identification number. Since a user can often submit several confidential jobs to a multi-function printing device, the device often organizes the confidential print jobs by users. This makes accessing the confidential print job burdensome on the user and results in the user having to navigate through several prompts initiated by the printing device. If several users have to take time to navigate through the various screens to access and print their confidential print jobs, the multi-function printing device can create a backlog of jobs being held at the device. Accordingly, a multi-function printing device that provides a shortcut to users for accessing and printing confidential print jobs is desired.

In one embodiment, the invention provides a printing device configured to communicate with a first device and a user input device. The printing device includes a controller having memory. The controller is operable to receive a first communication from the first device. The first communication includes a job to be processed by the printing device and a first shortcut access code associated with the job. The first shortcut access code is stored in the memory of the controller. The controller is also operable to receive a second communication from the user input device. The second communication includes a second shortcut access code. The controller holds the job to be processed until the controller receives the second communication and verifies the second shortcut access code matches the first shortcut access code.

In another embodiment, the invention provides a method of accessing a held job at a multi-function printing device coupled to a user input device. The method includes the step of receiving a communication from a device. The communication includes a held job and a shortcut access code associated with the held job. The method also includes the steps of receiving an input access code via the user input device, verifying whether or not the input access code matches the shortcut access code, displaying the held job at the multi-function printing device such that the held job can be accessed by a user, in response to the input access code matching the shortcut access code.

In a further embodiment, the invention provides a multi-function printing device configured to communicate with a plurality of devices. The plurality of devices includes at least one computer and a user input device. The multi-function printing device includes a user interface having a display and a controller coupled to the user interface and having memory. The controller is operable to receive a first communication from the at least one computer. The first communication includes a confidential print job to be processed by the multi-function printing device and a first shortcut access code associated with the confidential print job. The first shortcut access code is stored in the memory of the controller. The controller is also operable to receive a second communication from the user input device which includes a second shortcut access code. The controller holds the confidential print job to be processed until the controller receives the second communication and verifies the second shortcut access code matches the first shortcut access code. The controller also displays the confidential print job on the display of the user interface in response to the controller verifying the second shortcut access code matches the first shortcut access code.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Also, the term "held print job" and "held job" refer to those electronic files submitted to a document processing device, such as, for example, a multi-function printing device, which require the device to perform a certain function on the file, but that is held at the device (e.g., the function is not performed on the file) until a user releases the job at the device. The job can be a released once or several times.

Figure 1:
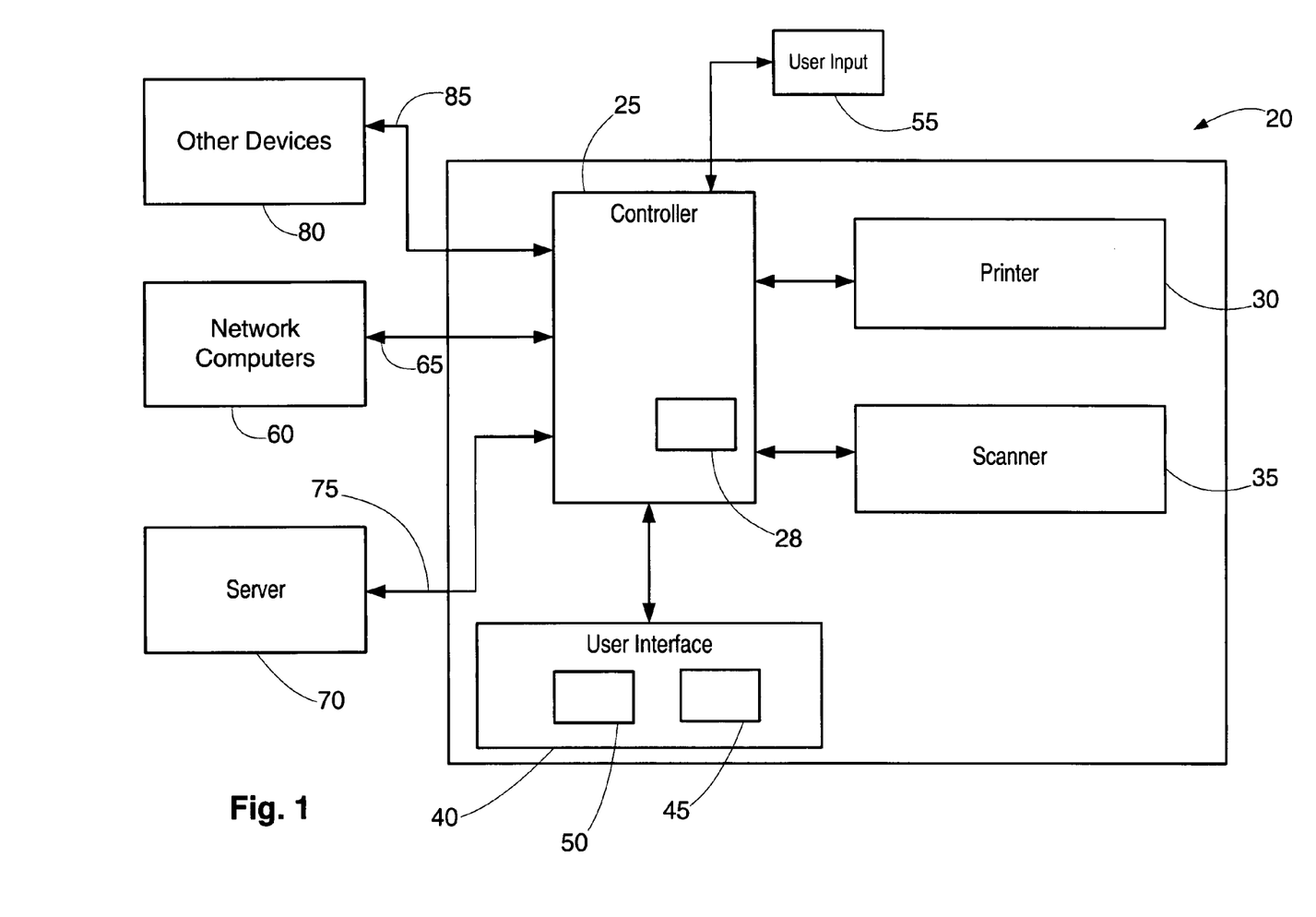
FIG. 1 is a schematic illustration of a multi-function printing device embodying the invention.

FIG. 1 schematically shows a device 20 capable of performing one or several related tasks in the area of scanning, printing, imaging, duplicating, emailing and faxing documents. In some embodiments, the device 20 is a multi-function printer ("MFP") that performs multiple of these processing functions. In a typical work environment, device 20 receives multiple requests (or jobs) from one or more users. Jobs either originate directly from the device 20 via physical interaction between a user and the device 20 or they are sent to the device 20 electronically from another device. Not all embodiments of the present invention require the use of a MFP, and the device 20 may be limited to a single document processing function (e.g., a printer, scanner, copier of fax machine, or the like).

Figure 2:
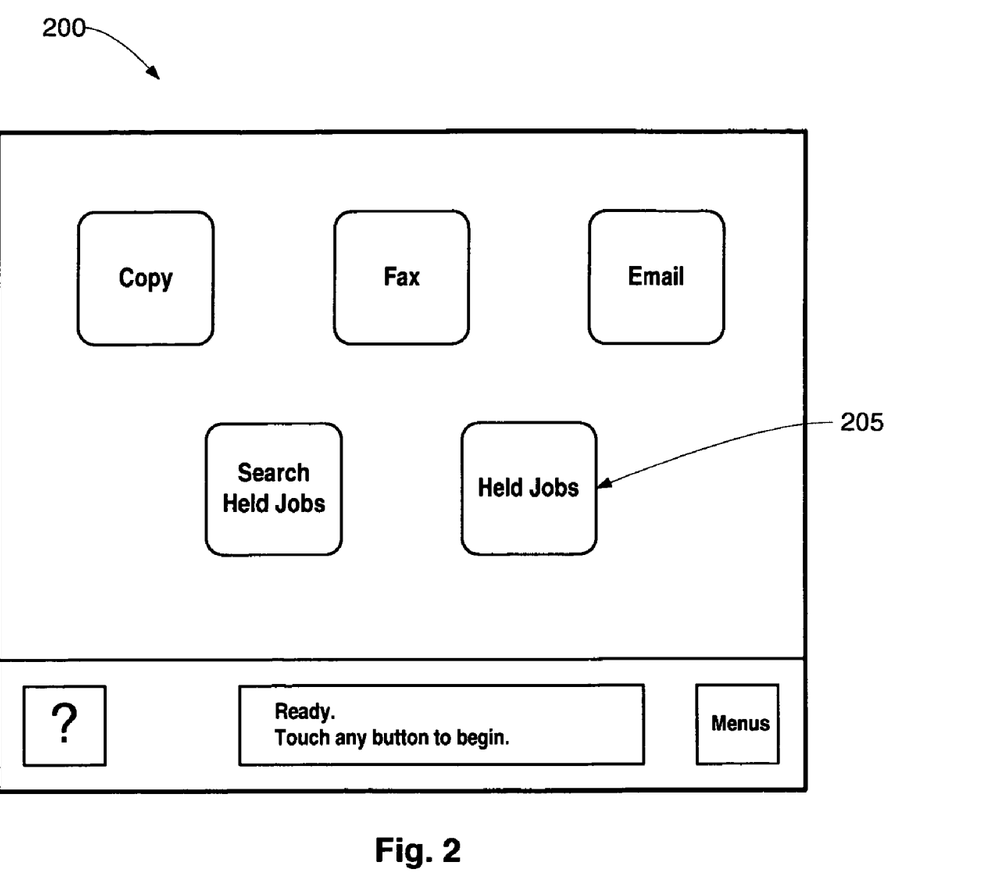
FIGS. 2-7 illustrate various screens displayed by a user interface of device, such as the multi-function printing device illustrated in FIG. 1.
Figure 3:
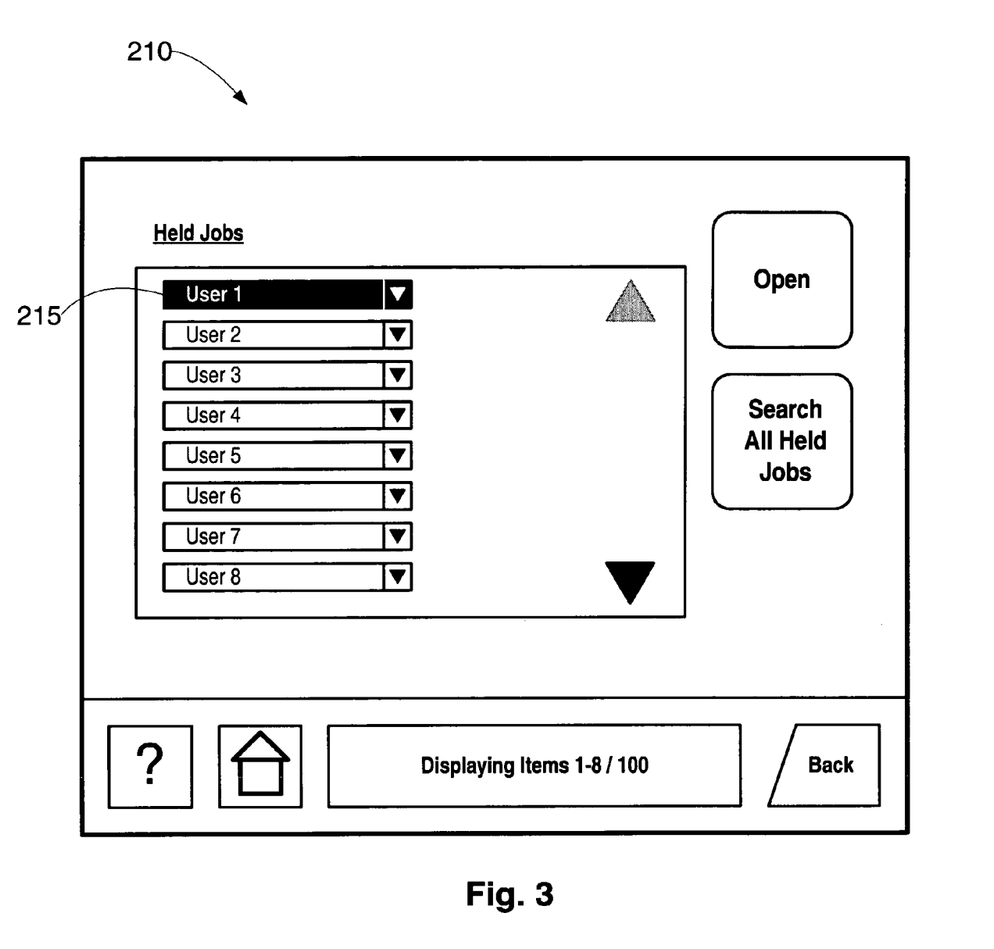

For illustration purposes, the construction shown in FIGS. 1 and 2 has a MFP as device 20 that is configured to support multiple users. Depending on the work environment, the device 20 may require proper identification of a user, or other information, before the device 20 can be operated. The device 20 may also hold and release jobs based on a user commands or other operating parameters. The release of the job may be accomplished, for example, by the user entering in an identification number or other indicia that indicates that the user is authorized to release the job. The identification number can be associated with the user who submitted the job (e.g., the proper user identification number) or can be an access code (e.g. shortcut code), which is a series of numbers, symbols or alphanumeric characters associated with the particular held job. In some embodiments, device 20 is configured to process a document (either a held job or a confidential job) using a shortcut access code associated with the job. This allows users to bypass searching for the confidential job or allows many users to access a frequently-submitted job numerous times without submitting the job each time.

As shown in FIG. 1, the device 20 includes a controller 25 having a shortcut module 26 and memory 28. The controller 25 monitors operation of the device 20 and controls various functions such as printing, confidential printing, scanning, duplicating and the like. The controller 25 also processes various jobs submitted from various users. For example, if a user submits a confidential print job to the device 20, the controller 25 can handle the authorization to release the job. In some embodiments, the controller 25 releases a confidential print job only after a user enters the proper shortcut access code. In some constructions, a shortcut access code is associated with a particular job. In one example, the shortcut access code is assigned by the user submitting the job and is subjected to validation by the shortcut module 26, as discussed below. In another example, the shortcut access code is assigned by the shortcut module 26 when the controller 25 receives the job and request for assignment of a shortcut access code, as also discussed below. The shortcut module 26 handles shortcut access code requests submitted by a user, generates shortcut access codes for submitted jobs, and validates proposed shortcut access codes. The shortcut module 26 maintains a list of assigned shortcut access codes in memory 28. The list includes the shortcut access codes currently assigned to existing held jobs.

The device 20 of FIG. 1 has various document processing modules, such as a printer 30 and a scanner 35. The printer 30 receives an electronic document representing a desired image from the controller 25 and prints a hard copy of the image on a print medium. Printer 30 communicates with controller 25, to receive and print an electronic image using techniques that are known in the art.

The scanner 35 includes a scanning area (not shown) on which an original can be placed either manually or automatically by being sequentially fed from a storage unit (not shown) under the control of the controller 25. For example, if the original includes multiple pages, an automatic feeder function (not shown) of the device 20 sequentially feeds the pages to the scanning area. Different types of scanners are known in the art and use different, but known processes for producing an electronic image of scanned document. In the illustrated embodiment, controller 25 handles the processing require to convert scanned data from the scanner 35 into an electronic image.

The device 20 also may include a user interface 40, which allows a user to control and monitor the various document processing functions. The user interface 40 is coupled to the controller 25 and includes at least one user input device 45 (sometimes referred to herein as a user control 45) to prompt the controller 25 to perform a function or to modify a particular function. Possible user input device 45 include one or more push buttons, keypad, keyboard, touch-screen or the like.

The user interface 40 may also include a display 50 that relates information to the user through various menus and screens, as discussed below. In some constructions, the display 50 is separate from the user input device 45. But in others, the display 50 can be combined with the user control 45, such as is the case with a touch screen.

In some embodiments, controller 25 communicates with other devices, such as the external user input device 55, which may take the form of an external keyboard, keypad or the like.

Similarly, device 20 may be in electronic communication with other processing devices such as computers 60 or other peripherals. In some embodiments, controller 25 handles the communication protocols necessary to send and receive data from electronically connected processing devices. Thus, in a multi-user work environment, controller 25 handles the data processing of jobs communicated to and from user workstations via a network. The computers 60 transfer data (such as, for example, a confidential print job) to and from the controller 25 of device 20 using I/O interfaces on the electronically-connected devices.

Figure 8:
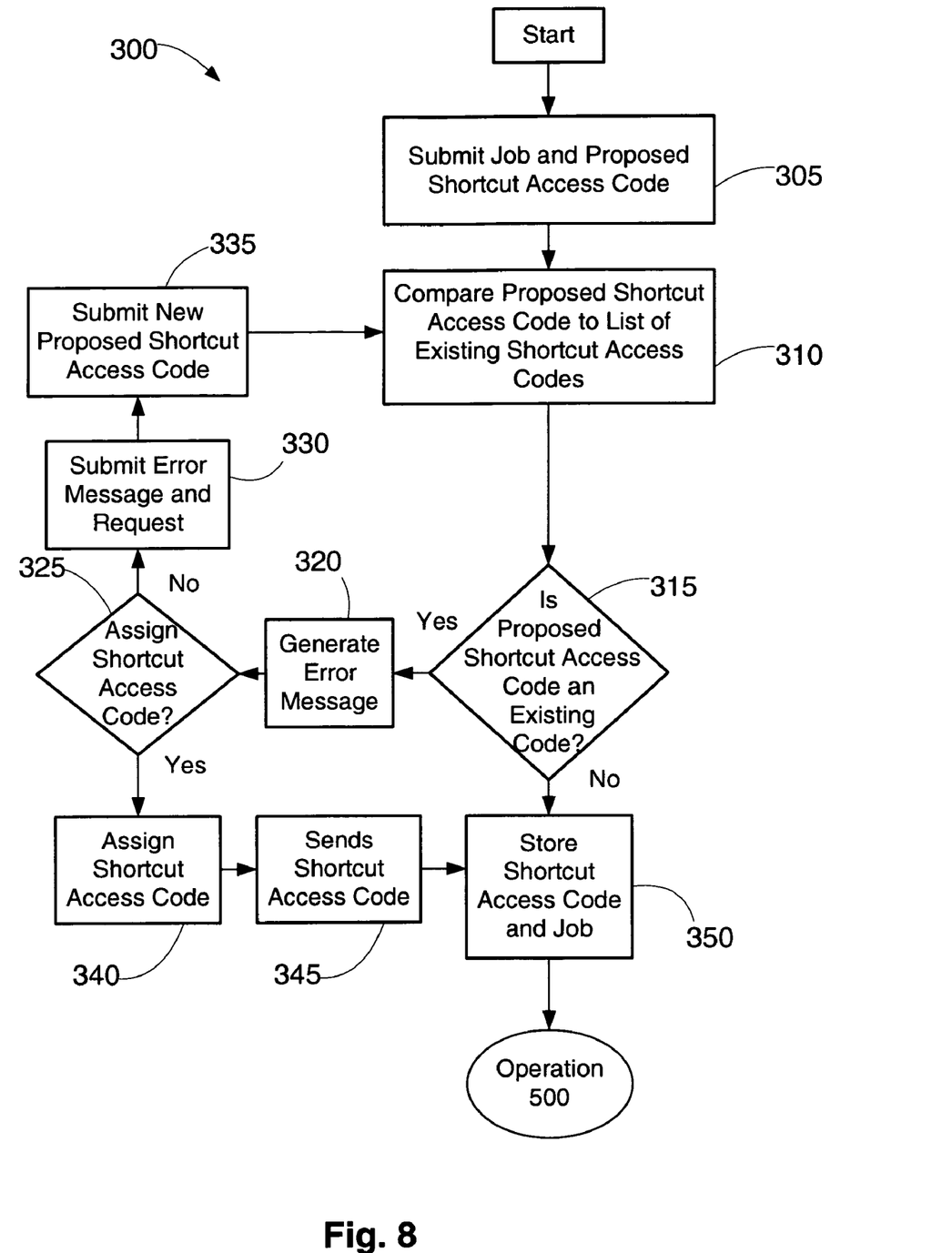
FIG. 8 is a flowchart illustrating operation of a multi-function printing device, such as the device shown in FIG. 1.

FIG. 8 illustrates a first example of operation 300 of the MFP 20 using the shortcut access codes. In this example, the user attempts to assign a shortcut access code to the held job by submitting a proposed shortcut access code. Referring to FIGS. 1 and 8, a computer 60 (or other peripheral device) submits a communication to the device 20 at step 305. In the construction illustrated in FIG. 8, the communication includes a confidential print job or held job and a proposed shortcut access code associated with the job. The proposed shortcut access code can be a shortcut access code generated by the computer 60 (or assigned by the user) but requires validation from the shortcut module 26. When the device 20 receives the submitted communication, the shortcut module 26 compares the proposed shortcut access code to the list of existing shortcut access codes at step 310. At step 315, the shortcut module 26 determines if the proposed shortcut access is an existing shortcut access code.

If the shortcut module 26 determines that the proposed shortcut access code is an existing code at step 315, then the controller 25 generates an error message to notify the user that the proposed code is invalid at step 320. The controller 25 then determines if the device 20 should generate the valid shortcut access code at step 325. In some constructions, the controller 25 can be programmed to allow the user a certain number of proposed assignment attempts before generating the shortcut access code for the user.

If the controller 25 determines that the shortcut module 26 should not generate the valid shortcut access code at step 325 (and thus allow the user to propose a second shortcut access code), then the controller 25 submits the error message to the user and requests that the user submit a new shortcut access code at step 330. In some constructions, the user resubmits the job with a new proposed shortcut code or simply submits the new proposed shortcut code at step 335.

If the controller 25 determines that the shortcut module 26 should generate the valid shortcut access code at step 325, then the shortcut module 26 assigns the valid shortcut access code to the job at step 340. The controller 25 then sends the shortcut access code to the user at step 345 and stores the job and shortcut access code at step 350.

Figure 10:
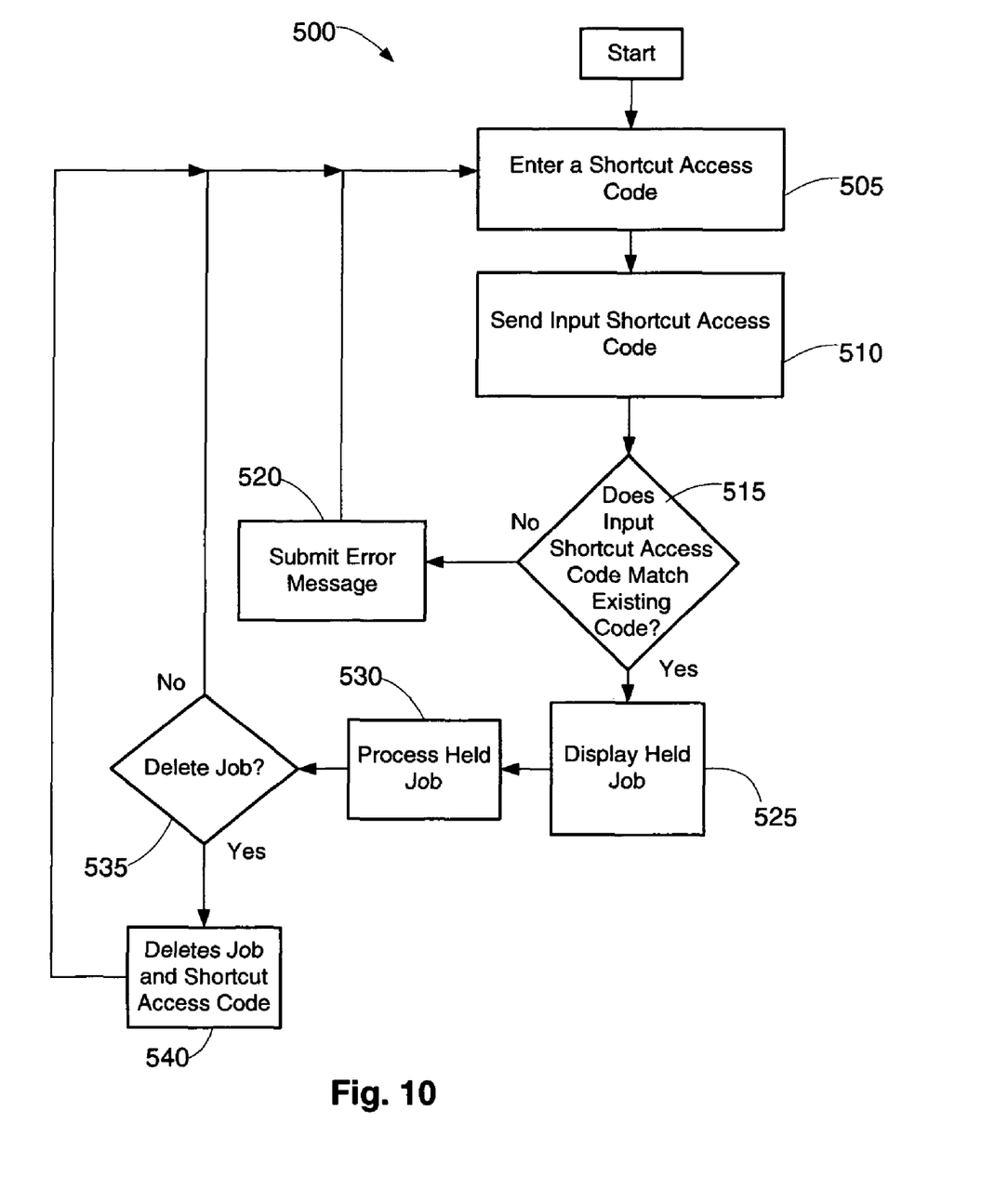
FIG. 10 is a further flowchart illustrating operation of a multi-function printing device, such as the device shown in FIG. 1.

Referring back to step 315, if the shortcut module 26 determines that the proposed shortcut access code is not an existing code, then the controller 25 stores the job and shortcut access code at step 350. Once the job and shortcut access code is stores at step 350, operation continues as shown in FIG. 10, as discussed below.

Figure 9:
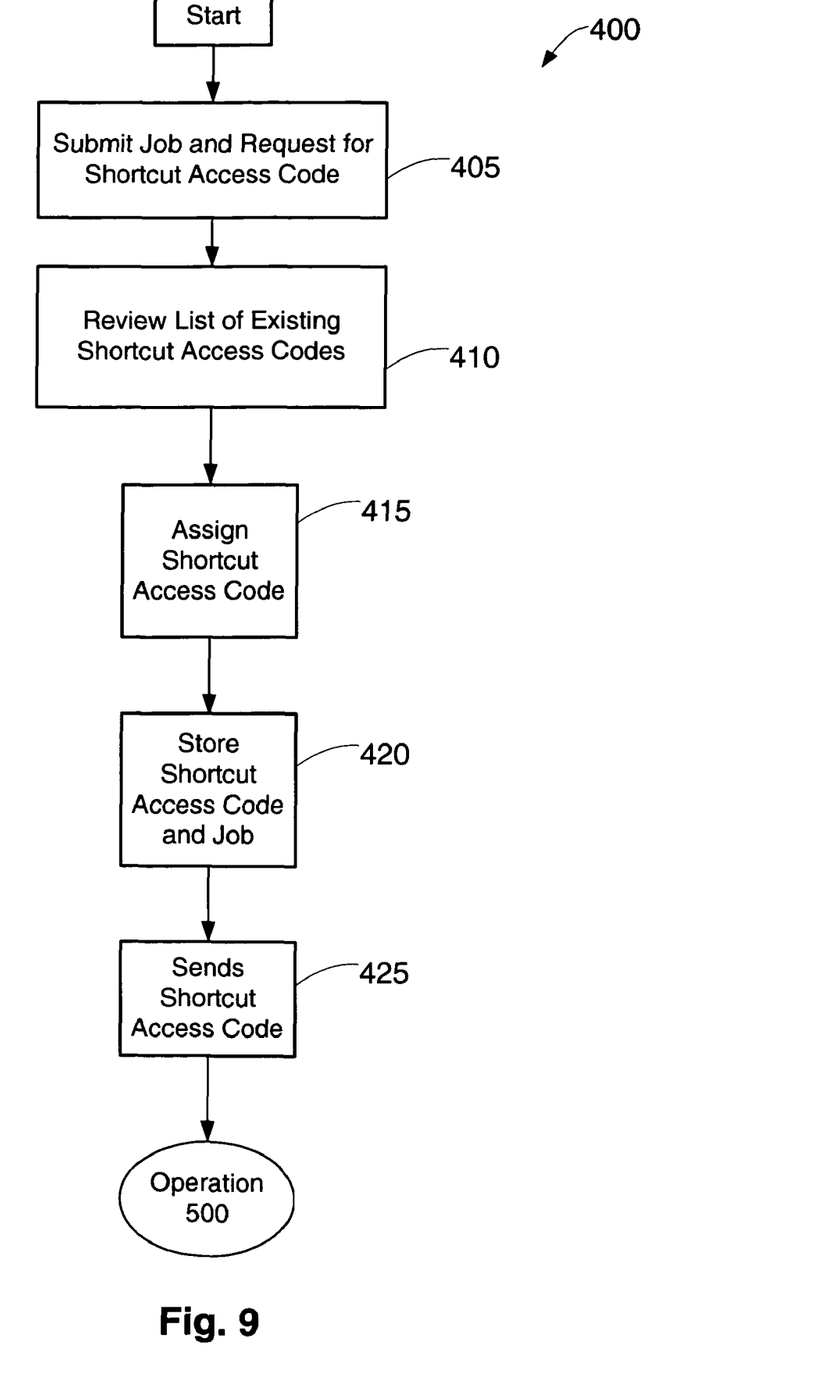
FIG. 9 is another flowchart illustrating operation of a multi-function printing device, such as the device shown in FIG. 1.

FIG. 9 illustrates a second example of operation 400 of the MFP 20 using the shortcut access codes. In this example, the shortcut access code is determined by the shortcut module 26 in response to a user's request. Referring to FIGS. 1 and 9, the computer 60 submits a communication to the MFP 20 at step 405. In the construction illustrated in FIG. 9, the communication includes the job and a request for a shortcut access code. When the device 20 receives the communication, the shortcut module 26 reviews the list of existing shortcut codes at step 410. Upon reviewing the list, the shortcut module 26 assigns a shortcut access code at step 415. The shortcut access code assigned by the shortcut module 26 does not include a code already included in the list of existing shortcut codes. The controller 25 stores the job and the assigned shortcut code at step 420 and sends a message to the user notifying the user of the shortcut access code assigned to the submitted job at step 425. Operation continues as shown in FIG. 10, as discussed below.

In FIG. 1, communication between the controller 25 and computers 60 occurs via communication network 65, which can be a wired or wireless network, or some combination of the two.

In the illustrated embodiment, the controller 25 communicates with a server 70. In an embodiment, the server 70 stores files that are accessible to controller 25. The files stored on server 70 may, for example, include electronic documents that are frequently accessed by users of device 20. While the illustrated figure shows that device 20 communicates with server 70 via a communications path 75, one of ordinary skill will recognize that server 70 may alternatively be part of network 65.

In some constructions, server 70 can submit a job relating to one of the frequently-accessed files to the device 20 as a held job and can have a shortcut number associated with that held job. For example, an initial user can submit one of the frequently-accessed files as a job that is held at the device 20 indefinitely and either the user or the shortcut module 26 assigns a shortcut access code to the particular held job. The corresponding shortcut access code would be stored in the list of existing shortcut access codes and assigned to the job for as long as the job is held at the device 20. The held job can then be accessed by any user who enters the proper shortcut access code without the necessity of each user submitting the job to the device 20. In other words, a job which is frequently submitted by one or more users can be submitted as a held job and held at the device 20 indefinitely. Rather than submitting the job as a new job each time, a user can simply enter the shortcut access code associated with the held job, and the device 20 will release the job. For example, a tax firm can store a particular form, such as a 1040 form, on the server 70 and assign a shortcut access code to that particular form, such as #1040. Every time a user needs to print the 1040 form, the user enters the short cut access code of #1040 at the device 20 and selects print, rather than submitting the print job to the device 20 from the user's workstation 60.

In other constructions, the server 70 stores a list of acceptable user identification codes with each assigned to a particular user for accessing the device 20. The identification codes can be used to gain access to the device 20, limit the held jobs that the user can access, or limit the device functions that the user can use. In further constructions, the server 70 can also communicate with the computers 60 operable to communicate with the controller 25 of the MFP 20 and can also store shortcut access codes associated with confidential print jobs originating at one or more of the computers 60.

As shown in FIG. 1, the controller 25 may also communicate with other devices 80, such as computers included in another network, personal digital assistants, additional servers, other peripheral devices, such as other printing devices, scanners, faxes, MFPs, and the like. Communication can take place between the controller 25 and the other devices 80 via a third link 85. In some constructions, the third link 85 can also be the same network which links the MFP 20 to the computers 60 or to the server 70. In other constructions, the third link 85 can be a different link from the first link 65 and second link 75, such as, for example, a wireless network, a wired network, combination of both, a phone line, a serial cable or another similar wired or wireless link.

FIGS. 2-7 illustrate the various screens (displayed on the user interface 40) users maneuver through to traditionally access a held job, such as a confidential print job. FIG. 2 shows the initial Home screen 200 displayed on the user interface 40 of the MFP 20. In some constructions in which the user does not need to enter a user identification code to access the MFP 20, the Home screen 200 is the first screen displayed. In other constructions, the controller 25 displays the Home screen 200 once the user logs into the MFP 20.

As shown in FIG. 2, the user selects the Held Jobs button 205 included in Home screen 200 in order to access the confidential print job. In the illustrated construction, selecting the Held Jobs button 205 in Home screen 200 brings the user to the Held Jobs screen 210 shown in FIG. 3. The user selects the proper user folder, such as the User1 folder 215, from the Held Jobs screen 210. In the illustrated construction, the confidential print job submitted by a user, such as User1, would be found under that user's folder in the Held Jobs screen 210, such as the User1 folder 215. In other constructions, the held jobs screen 210 will show only those held jobs that are associated with the logged on user. In other constructions, held jobs that are not associated with the user are grayed out or otherwise identified to indicate to the user that he or she does not have access to them.

Figure 4:
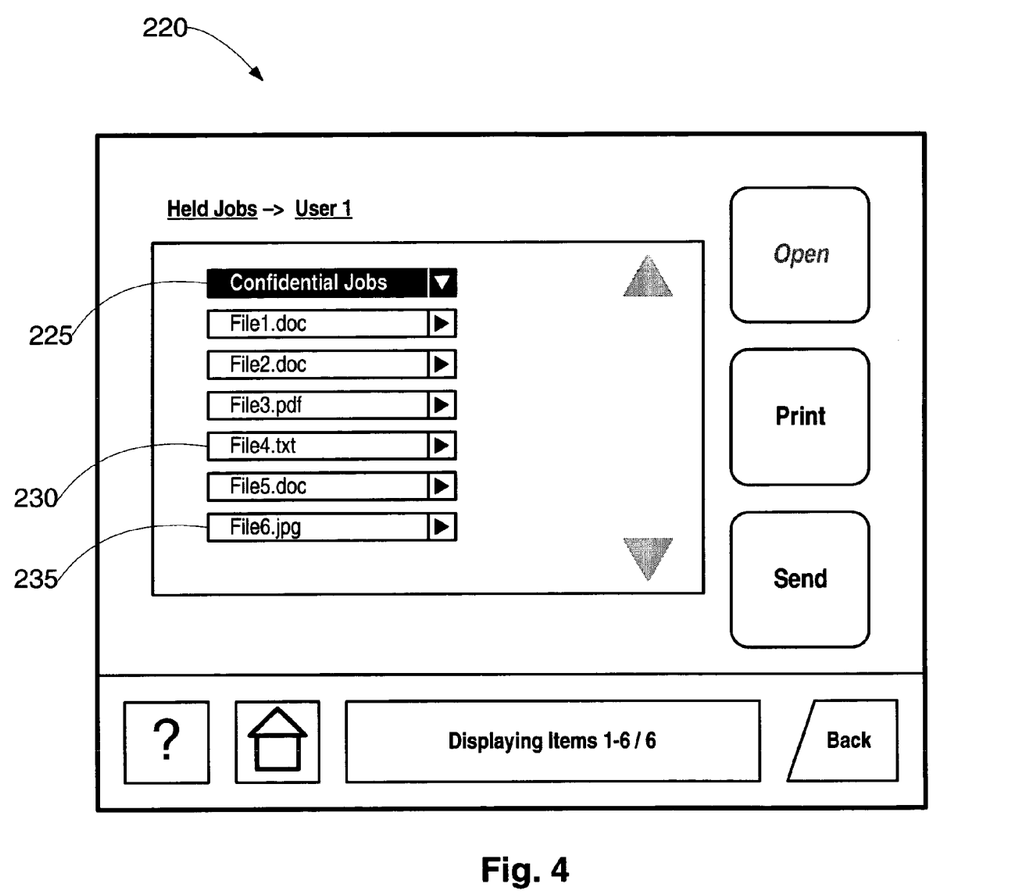

FIG. 4 shows a user's job screen 220 that is displayed once the user selects a held job from screen 210. In some embodiments, the User's Job screen 220 displays all the held jobs associated with a particular user. In embodiments in which the held jobs screen 210 displays only those jobs associated with a user, the user's jobs screen can be eliminated or, alternatively, can be used to display additional information about a particular held job. Screen 220 includes the Confidential Jobs folder 225, which shows confidential jobs submitted by a user. As shown in FIG. 4, any held jobs that do not require to be confidentially printed, such as files 230 and 235, are optionally displayed on the User's Job screen 220.

Figure 5:
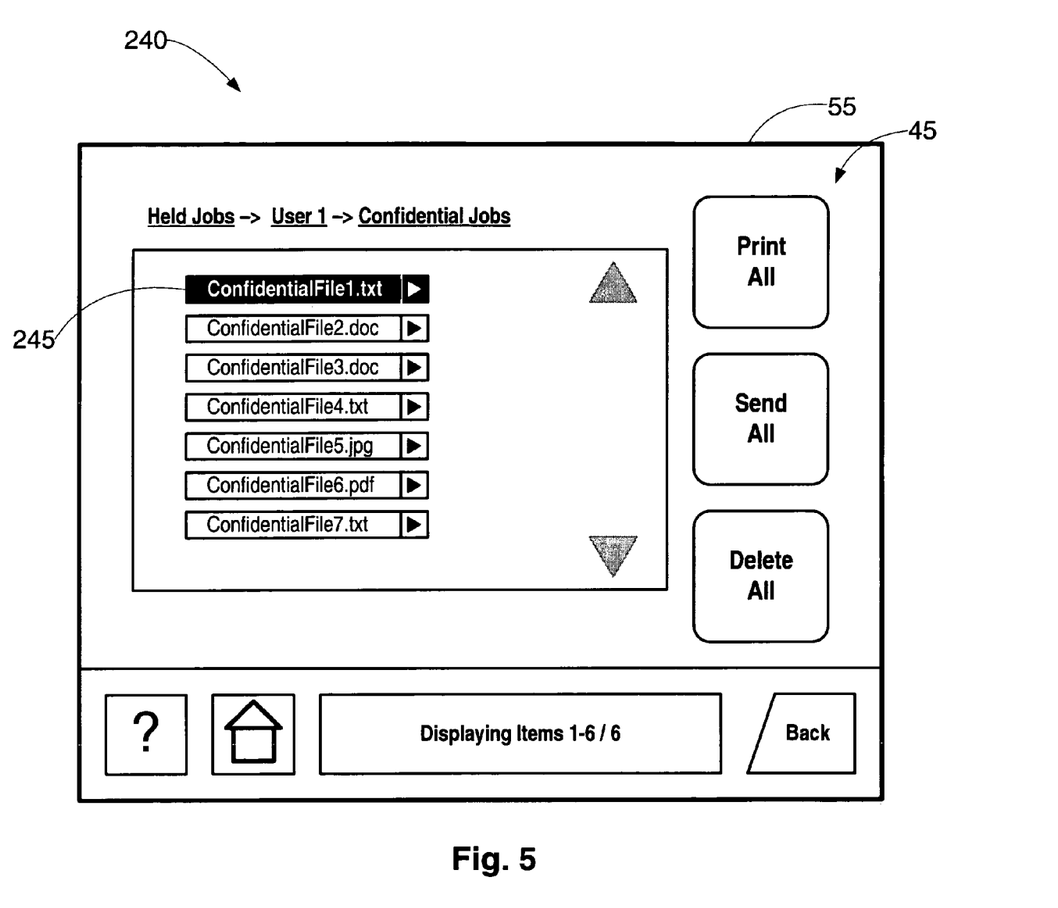
Figure 6:
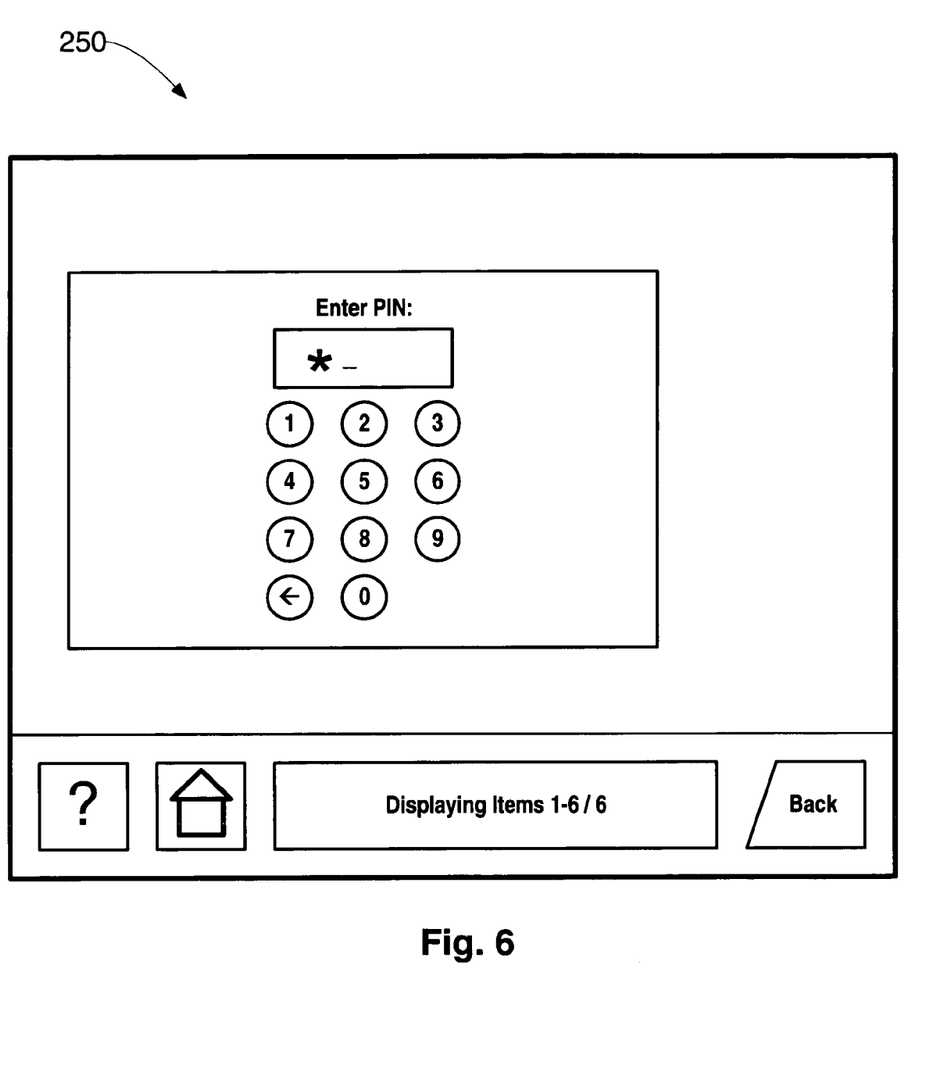

An exemplary Confidential Jobs screen 240 is shown in FIG. 5. When a user selects the Confidential Jobs folder 225 displayed in the User's Job screen 220, the controller 25 displays the Confidential Jobs screen 240. The screen 240 lists the confidential jobs submitted to the MFP 20 under that user, or alternatively the screen 240 shows the confidential jobs that a particular user has access to. When, the user selects the desired confidential job, such as the confidential file 245, the controller 25 displays the Identification screen 250 shown in FIG. 6. In one embodiment, a user must enter a proper user identifier in the Identification screen 250 to access a confidential job. In other embodiments, an initial logon by a user provides sufficient authorization to access the confidential jobs.

Figure 7:
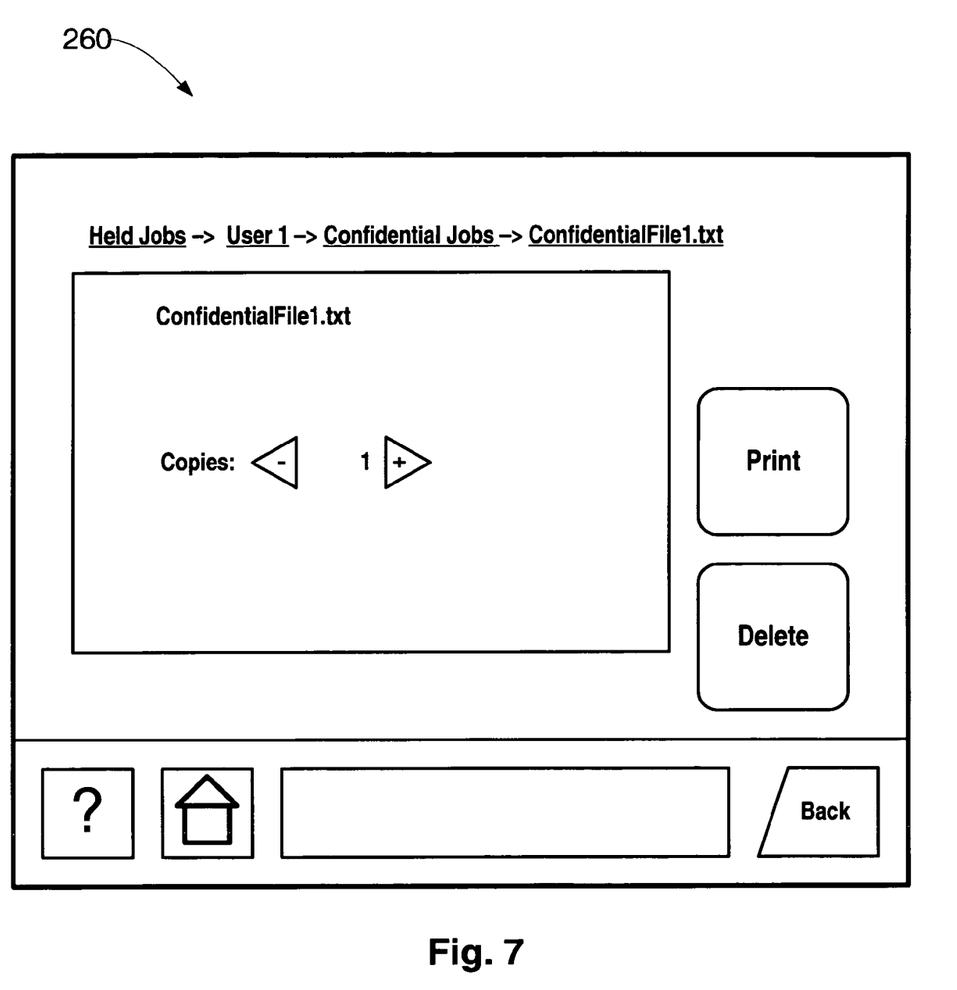

If the user enters the proper identification code, the controller 25 grants access to the confidential job as shown in the Access screen 260. In this example, the user can determine how many copies of the confidential file to print in Access screen 260 and then prompts the MFP 20 to print or delete the file.

As shown in FIGS. 2-7, when the confidential job is submitted to the MFP 20 without a shortcut access code, the user in turn must navigate through various screens before accessing the confidential job. As shown and described with respect to FIG. 10, a user does not have to navigate through the many screens of FIGS. 2-7 when the confidential job is submitted to the MFP 20 and includes an accompanying shortcut access code (either proposed by the user and validated by the shortcut module 26 or assigned by the shortcut module 26). FIG. 10 illustrates the operation 500 of accessing jobs held by the device 20 via the shortcut access code. As shown, when a user wants to access the held job, the user can enter the shortcut access code, for example, via the user input device 55 at step 505. The user input device 55 sends a second communication to the controller 25 at step 510. The second communication includes the number entered by the user via the user input device 55. The second communication prompts the controller 25 to verify if the entered shortcut access code matches a shortcut access code included in the list of existing shortcut access codes stored in memory 28 at step 515. If the entered shortcut access code is not valid (e.g., does not match an existing shortcut access code) at step 515, the controller 25 does not display the Access screen associated with the confidential job. Rather, the controller 25 displays an error message indicating that the entered code is not a recognized shortcut access code at step 520. The controller 25 then waits for the user to enter another code at step 505.

If the entered shortcut access code matches an existing code at step 515, the controller 25 displays the Access screen associated with the held job at step 525. The Access screen displayed can be the Access screen 260 shown in FIG. 7. The controller 25 can then process the held job in response to a user prompt at step 530. In some constructions, the Access screen 260 allows the user to prompt the MFP 20 to process the held job, such as, for example, through the user control 45. In other constructions, the verification of the proper shortcut access code prompts the MFP 20 to process the held job.

In some constructions, the controller 25 deletes the held job once the job has been processed. In other constructions, the controller 25 keeps the job as a held job once the job has been processed. In these constructions, the controller 25 keeps the held job such that users can continue to access the job using the associated shortcut access code repeatedly, without having to submit the job and shortcut access code to the MFP 20 in a subsequent communication. The controller 25 may keep the job as a held job for a specific amount of time or may hold the job as a held job indefinitely. In some constructions, the controller 25 may keep the job as a held job until the user who originally submitted the job, deletes the job. In these constructions, the user can submit one or more jobs as a held job for the MFP 20 to hold for a specific amount of time or instruct the controller 25 to hold the job until the user terminates the held job.

Still referring to FIG. 10, once the job has been processed at step 530, the controller 25 determines whether to delete the job or whether to hold the job at step 535. If job is not supposed to be deleted after being processed at step 530, the controller 25 does not delete the job and waits for a user to enter a shortcut access code at step 505. In this instance, a subsequent user can enter the shortcut access code again and the held job can be accessed and processed a second time. If the job is supposed to be deleted after being processed at step 530, then the controller 25 deletes the job and the corresponding shortcut access code from memory 28 at step 540 and waits for a user to enter a shortcut access code at step 505.

Thus, the invention provides, among other things, a multifunction printing device operable to execute jobs via a shortcut command. Various features and advantages of the invention are set forth in the following claims.

What is claimed is:

1. A document processing device configured to communicate with a first device and a user input device, comprising:
a controller having memory and operable to receive a first communication from the first device, the first communication including a job to be processed by the document processing device, the job having a first shortcut access code associated with the job, the first shortcut access code being a proposed shortcut access code and stored in the memory of the controller and included in the first communication, the controller being operable to receive a second communication from the user input device, the second communication including a second shortcut access code;
wherein the controller holds the job to be processed until the controller receives the second communication and verifies the second shortcut access code matches the first shortcut access code, and
wherein the controller further includes a shortcut module operable to receive the proposed shortcut access code and to compare the proposed shortcut access code a list of existing shortcut access codes and determining whether the proposed shortcut access code is valid if the proposed shortcut access code does not match a shortcut access code included in the list of existing shortcut access codes.

2. The document processing device of claim 1, further comprising a user interface having a display, the user interface being coupled to the controller.

3. The document processing device of claim 2, wherein the controller displays the job on the display of the user interface in response to the controller verifying the second shortcut access code matches the first shortcut access code.

4. The document processing device of claim 1, wherein the controller processes the job subsequent to the controller verifying the second shortcut access code matches the first shortcut access code.

5. The document processing device of claim 4, wherein the controller deletes the job when the controller processes the job.

6. The document processing device of claim 4, wherein the controller is operable to receive a third communication from the user input device, the third communication including a third shortcut access code.

7. The document processing device as of claim 6, wherein the controller continues to hold the job until the controller receives the third communication and verifies the third shortcut access code matches the first shortcut access code.

8. The document processing device of claim 7, wherein the controller processes the job subsequent to the controller verifying the third shortcut access code matches the first shortcut access code.

9. The document processing device of claim 1, wherein the first communication also includes a shortcut access code request.

10. The document processing device as set forth in claim 9, wherein the controller further includes a shortcut module operable to receive the shortcut access code request and operable to generate the first shortcut access code associated with the job.

11. A method of accessing a held job at a multi-function printing device coupled to a user input device, comprising:
  receiving a communication from a device, the communication including a held job and a shortcut access code associated with the held job, the shortcut access code being a proposed shortcut access code and included in the communication;
  receiving an input access code via the user input device;
  verifying whether or not the input access code matches the shortcut access code; and
  displaying the held job at the multi-function printing device such that the held job can be accessed by a user, in response to the input access code matching the shortcut access code;
  wherein the multi-function device includes a shortcut module operable to receive the proposed shortcut access code and to compare the proposed shortcut access code to a list of existing shortcut access codes and determines whether the proposed shortcut access code is valid if the proposed shortcut access code does not match a shortcut access code included in the list of existing shortcut access codes.

12. The method of claim 11, further comprising processing the held job in response to a prompt by the user.

13. The method of claim 12, wherein the held job is a confidential print job and wherein the processing the held job in response to the prompt by the user includes printing the confidential print job in response to a prompt by the user.

14. The method of claim 12, further comprising holding the held job at the multi-function printing device such that the held job cannot be accessed by the user subsequent to the processing the held job in response to the prompt by the user.

15. The method of claim 14, further comprising:
  receiving a second input access code via the user input device;
  verifying whether or not the second input access code matches the shortcut access code; and
  displaying the held job at the multi-function printing device such that the held job can be accessed by the user, in response to the second input access code matching the shortcut access code.

16. The method of claim 15, further comprising processing the held job in response to a prompt by the user.

17. The method of claim 15, further comprising storing the shortcut access code in a memory of the multi-function printing device.

18. The method of claim 11, further comprising storing the shortcut access code in a memory of the multi-function printing device.

19. The method of claim 11, wherein the displaying the held job includes displaying the held job on a user interface such that the held job can be accessed by the user, in response to the input access code matching the shortcut access code.

20. A multi-function printing device configured to communicate with a plurality of devices, the plurality of devices includes at least one computer and a user input device, the multi-function printing device comprising:
  a user interface having a display;
  a controller coupled to the user interface and having memory, the controller operable to receive a first communication from the at least one computer, the first communication including a confidential print job to be processed by the multi-function printing device and a first shortcut access code associated with the confidential print job, the first shortcut access code being a proposed short access code and stored in the memory of the controller and included in the first communication, the controller is also operable to receive a second communication from the user input device, the second communication including a second shortcut access code;
  wherein the controller holds the confidential print job to be processed until the controller receives the second communication and verifies the second shortcut access code matches the first shortcut access code; and
  wherein the controller displays the confidential print job on the display of the user interface in response to the controller verifying the second shortcut access code matches the first shortcut access code, and
  wherein the controller further includes a shortcut module operable to receive the proposed shortcut access code and to compare the proposed shortcut access code to a list of existing shortcut access codes and determine whether the proposed shortcut access code is valid if the proposed shortcut access code does not match a shortcut access code included in the list of existing shortcut access codes.

21. The multi-function printing device of claim 20, wherein the user interface also includes a user control and wherein the controller prints the confidential print job in response by the prompt from the user via the user control.

* * * * *